(12) United States Patent
Stimpfl

(10) Patent No.: US 7,641,543 B2
(45) Date of Patent: Jan. 5, 2010

(54) PROCESS AND DEVICE FOR CUTTING SAUSAGE

(76) Inventor: Christof Stimpfl, 2 Höferweg, Vogt (DE) 88267

( * ) Notice: Subject to any disclaimer, the term of this patent is extended or adjusted under 35 U.S.C. 154(b) by 312 days.

(21) Appl. No.: 11/719,575

(22) PCT Filed: Nov. 11, 2005

(86) PCT No.: PCT/EP2005/012084

§ 371 (c)(1),
(2), (4) Date: May 17, 2007

(87) PCT Pub. No.: WO2006/053681

PCT Pub. Date: May 26, 2006

(65) Prior Publication Data

US 2009/0075577 A1    Mar. 19, 2009

(30) Foreign Application Priority Data

Nov. 19, 2004   (DE) .................. 10 2004 056 038

(51) Int. Cl.
*A22C 11/00* (2006.01)
(52) U.S. Cl. ..................................... 452/31
(58) Field of Classification Search ............. 452/30–32, 452/35, 46–48, 51
See application file for complete search history.

(56) References Cited

U.S. PATENT DOCUMENTS

| 2,463,157 | A | * | 3/1949 | Deitrickson | .................. | 452/49 |
| 2,800,681 | A | * | 7/1957 | Demarest | ..................... | 452/31 |
| 4,322,871 | A | * | 4/1982 | Townsend et al. | ............ | 452/31 |
| 4,366,600 | A | | 1/1983 | Townsend et al. | | |
| 4,584,740 | A | * | 4/1986 | Townsend | ..................... | 452/31 |
| 6,659,855 | B2 | * | 12/2003 | Stimpfl | ........................ | 452/49 |

FOREIGN PATENT DOCUMENTS

| DE | 106 131 | 6/1974 |
| DE | 43 07 637 | 12/1993 |
| DE | 43 18 301 | 12/1993 |

\* cited by examiner

*Primary Examiner*—Thomas Price
(74) *Attorney, Agent, or Firm*—Bachman & LaPointe, P.C.

(57) ABSTRACT

A process for cutting sausages from a sausage link by a cutting device to which the sausages in the sausage link are conveyed together and a cutting site between two successive sausages is recognized by a sensor device, the sausage link being retracted with the front most sausage behind the sensor device after a predetermined number of sausages has been cut. This permits a specific indexing of the sausages in the sausage link after the sensor device and prevents bottlenecks between the cutting machine and the packaging machine.

2 Claims, 1 Drawing Sheet

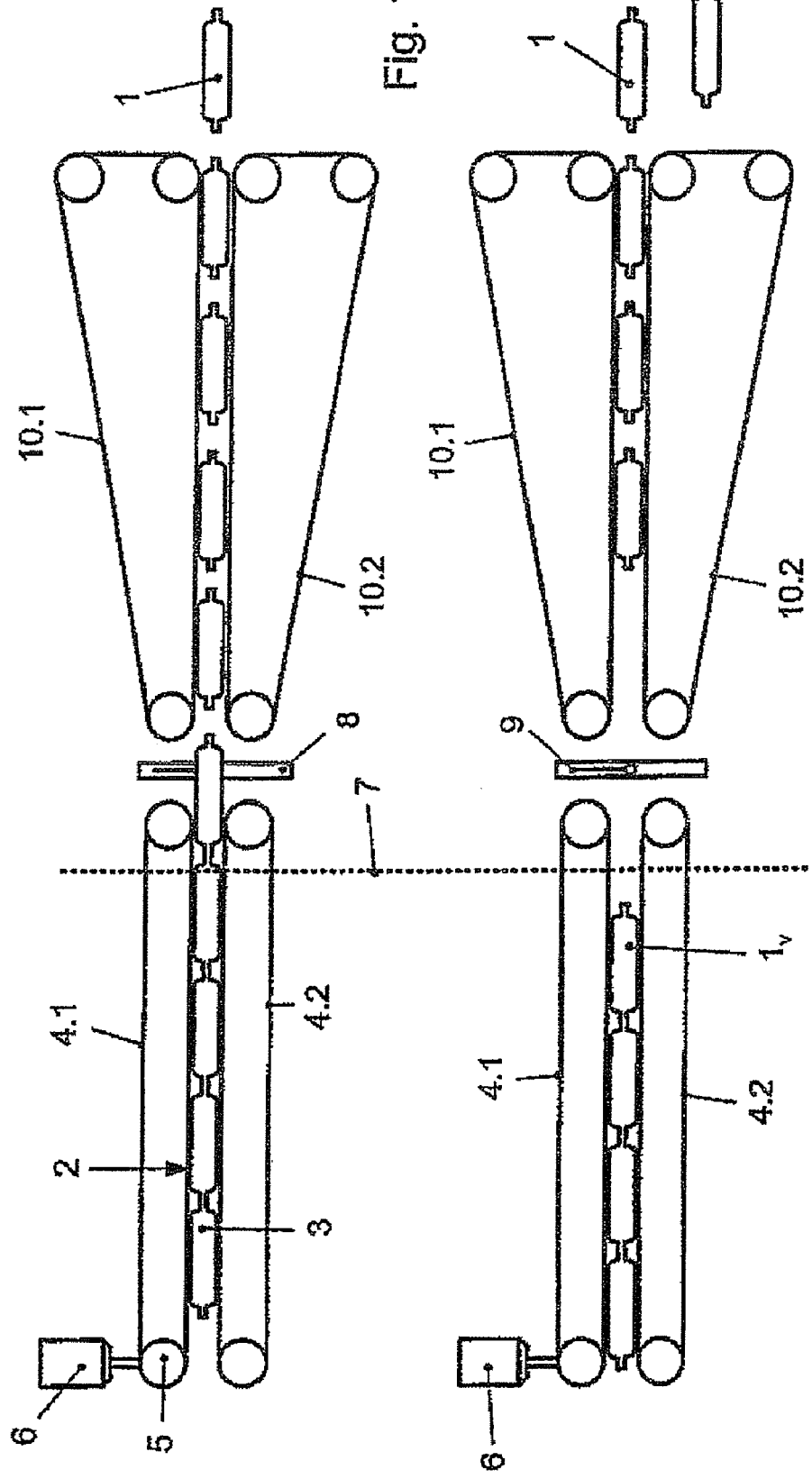

PROCESS AND DEVICE FOR CUTTING SAUSAGE

BACKGROUND OF THE INVENTION

The invention relates to a process for cutting sausages from a string of sausages by means of a cutting device to which the sausages linked together on the string of sausages are conveyed, and a separating point between two consecutive sausages is recognized with the aid of a sensor device, and to a device for this.

Devices for cutting sausages are known in diverse forms and embodiments and are obtainable commercially. Sausages nowadays are produced in such a manner that a skin, whether a natural or artificial skin, is filled with the appropriate sausage meat in sausage portions. Between the individual portions, the skin is rotated and/or clips, by means of which the individual sausages are divided from one another, are inserted. This produces a string of sausages from which the sausages have to be cut later, for example for the automatic packaging of a certain number of sausages. This still takes place nowadays in a highly complicated manner by hand or by means of machines, as are described, for example, in DE 43 18 301 A1 or DE 43 07 637 A1. In this case, the sausages are severed from the string of sausages at a cutting point, with the cutting point being recognized beforehand by a sensor. This may be a sensor as described in DE 43 18 301 A1 mentioned above, but other sensor devices are also conceivable, as described, for example, in DD 106 131 or DE-A 31 21 432.

Difficulties arise if only a certain number of sausages are to be severed from the string of sausages and supplied, for example, to a packaging device. Firstly, the absolutely continuous supplying of the sausages to a packaging machine operating in a portionwise manner has an unfavorable effect, generally causing a bottleneck to arise between the cutting machine and the packaging machine. Secondly, the indexing of the sausages on the string of sausages after the sensor device and, in particular, after passing through the cutting point is no longer correct, and so distortion and therefore inaccuracy may occur during the cutting operation.

The object of the present invention is to provide a process and a device of the abovementioned type, wherein a substantial improvement in the portionwise dispensing of sausages is obtained.

SUMMARY OF THE INVENTION

The problem is solved in that, after a predetermined number of sausages is cut, the string of sausages is drawn back with the frontmost sausage behind the sensor device.

This means that the recognition of the sausages, in particular the recognition of the separating point between two sausages, always begins anew, after a certain number of sausages are cut off from the string of sausages. This not only has the result that the severing of the separating point between two sausages on the string of sausages is carried out substantially more accurately, but, by the string of sausages being drawn back, a certain distance is produced between the frontmost sausage still remaining on the string of sausages and the last severed sausage, and therefore a following packaging machine, as an example, can prepare a new packaging unit to receive the following number of sausages.

For the control of the machine, the novel process according to the invention does not signify any great rearrangement. All that is necessary in each case is for a counting unit to be provided, but this is usually already present in known machines. Furthermore, the control unit has to be able to emit a signal to a drive for the conveying device to the effect that, namely, after a certain number of sausages have been cut off, the conveying direction is reversed. For this purpose, a servomotor is preferably used as the motor for the conveying device. As the conveying device itself, the conveyor belts known from the abovementioned prior art, in particular in the form of endless belts, are suitable.

BRIEF DESCRIPTION OF THE DRAWINGS

Further advantages, features and details of the invention emerge from the description below of a preferred exemplary embodiment with reference to the drawing, in which FIG. 1 shows a schematic plan view of part of a machine for cutting individual sausages 1 from a string of sausages 2; in this case, the sausages 1 on a string of sausages 2 are connected to one another via a separating point 3, in particular a twisting point;

FIG. 2 shows a plan view of the region of the cutting machine according to FIG. 1 in a different use position.

DETAILED DESCRIPTION

The string of sausages 2 comes, for example, out of a filling machine. In the machine for cutting the sausages, the string of sausages 2 is held between two endless belts 4.1 and 4.2, with at least one endless belt 4.1 or a corresponding deflection pulley 5 being assigned a servomotor 6.

Guided between the two endless belts 4.1 and 4.2, the string of sausages 2 passes through a sensor device 7 for recognizing a separating point 3, before a frontmost sausage reaches a cutting device 8. A cutting knife 9 is indicated schematically there. This cutting knife 9 is used to separate a frontmost sausage from the string of sausages 2 by the separating point 3 being cut through.

The now separated sausages 1 pass between two further conveyor belts 10.1 and 10.2, for example, to a packaging machine in which the sausages 1 are then supplied to an appropriate packaging.

The manner of operation of the present invention is as follows:

The string of sausages 2 comes, as mentioned above, from a filling machine, for example, and passes between the two endless belts 4.1 and 4.2. In these endless belts 4.1 and 4.2, the string of sausages 2 also passes through the sensor device 7 which recognizes the respective separating point 3 between two sausages 1. At the same time, the number of sausages 1 is counted with reference to the separating points 3.

After the sensor device 7, the string of sausages 2 passes to the cutting device 8 in which a predetermined number of separating points 3 is cut through. In the present case, there are five separating points 3, and therefore five separate sausages 1 also pass between the conveyor belts 10.1 and 10.2.

After this predetermined number of severed sausages 1, the servomotor 6 is switched over, and therefore the direction of rotation of the endless belts 4.1 and 4.2 is likewise reversed. The string of sausages 2 is therefore drawn back. This takes place until a frontmost sausage 1 (see FIG. 2) passes behind the sensor device 7.

As soon as the sensor device 7 no longer recognizes any sausage or any severing point, the servomotor 6 switches over the direction of rotation again, and therefore the frontmost sausage 1 passes again to the sensor device 7 and the frontmost end of this sausage 1 is recognized. The counting and precise recognition of the separating point between the sausages 1 now begins anew until a predetermined number of sausages 1 has again been cut off.

The invention claimed is:

1. A process for cutting a predetermined number of sausages from a string of sausages comprising the steps of:

providing a first conveyor system for delivering a string of sausages to a cutting station and a second conveyor system separate from and downstream of the first conveyor system for conveying sausages cut from the string of sausages to a packaging machine, wherein a cutting station is positioned between the first and second conveyor systems for cutting sausages from the string of sausages;

providing a sensor device which (1) recognizes a separating point between two sausages and (2) counts a predetermined number of sausages with reference to the recognized separating points;

providing a servomotor for selectively driving the first conveyor system in a forward and reverse direction in response to the sensor device; wherein (a) the first conveyor system passes a string of sausages through the sensor device which recognizes the respective sensing point between two sausages and counts a predetermined number of sausages, wherein the predetermined number of sausages are separated from each other at the cutting station; and (b) thereafter, the sensor device signals the servomotor to reverse to draw back the string of sausages until the foremost sausage is no longer sensed by the sensing device; and (c) repeating steps (a) and (b).

2. A device for cutting a predetermined number of sausages from a string of sausages comprising:

a first conveyor means for delivering a string of sausages to a cutting station;

a second conveyor means for delivering cut sausages to a packaging station, wherein the second conveyor means is separate from and downstream of said first conveyor means and the cutting station is located between the first or second conveyor means;

sensor means for recognizing and counting a predetermined number of separating points between sausages and signaling a servomotor for driving the first conveyor system in a reverse direction after counting the predetermined number of sausages.

* * * * *